Patented Apr. 8, 1947

2,418,724

UNITED STATES PATENT OFFICE 2,418,724

ISOMERIZATION OF SATURATED HYDROCARBONS

Herman Pines and Richard C. Wackher, Riverside, Ill., assignors to Universal Oil Products Company, Chicago, Ill., a corporation of Delaware No Drawing. Application November 19, 1943, Serial No. 510,913

12 Claims. (Cl. 260—683.5)

This invention relates to the catalytic isomerization of isomerizable saturated hydrocarbons and is more specifically concerned with an improved process wherein these hydrocarbons are isomerized under carefully selected conditions of operation in the presence of phenols or certain substituted phenols.

The isomerization of saturated hydrocarbons has assumed considerable importance at the present time, particularly the isomerization of normally liquid paraffinic hydrocarbons such as pentane, hexanes, heptanes, etc., which upon isomerization produce compounds which have very desirable antiknock properties when included in aviation gasoline blends and other motor fuels. Moreover, these isomerized products, especially the isomers having at least one tertiary carbon atom per molecule, may be alkylated with an alkylating agent such as an olefin, alcohol, etc., to produce higher molecular weight alkyl derivatives which have very desirable antiknock qualities and which are useful intermediates in organic synthesis.

It is well known that saturated hydrocarbons may be isomerized using catalysts of the Friedel-Crafts type such as aluminum halides, zinc halides, zirconium halides, or mixtures thereof in the presence of a hydrogen halide. The primary operating difficulty accompanying these isomerization operations is the tendency toward high catalyst consumption due to the formation of metal halide-hydrocarbon complexes. The catalyst complexes or sludges are formed by the interaction of metal halide with the products of decomposition reactions which occur simultaneously with the isomerization reaction.

Various methods have been proposed to prevent the decomposition of the saturated hydrocarbons thereby preventing high catalyst consumptions. For example, it has been proposed to introduce hydrogen into the reaction zone to suppress decomposition and presumably to hydrogenate unsaturated hydrocarbon fragments formed by decomposition of the charging stock. The use of hydrogen as a decomposition suppressor has been found to be very expensive and entails the use of a considerable amount of auxiliary equipment such as compressors, separators, etc., to provide a means for recycling the hydrogen to the reaction zone.

It is an object of the present invention to provide a method for suppressing the decomposition of the isomerizable hydrocarbons which is economical and practical and which obviates the difficulties which are inherent in the use of hydrogen.

Broadly, the invention comprises a process for isomerizing a saturated hydrocarbon by contacting said hydrocarbon and a relatively minor amount of an added phenol, aryl phenol, alkyl phenol, or cycloalkyl phenol with an isomerizing catalyst under isomerization conditions.

In one specific embodiment the present invention comprises a process for the production of isopentane by contacting normal pentane containing a phenol, an aryl phenol, an alkyl phenol, or a cycloalkyl phenol with an aluminum chloride-hydrogen chloride catalyst under isomerizing conditions.

We have discovered that the addition of phenols or certain substituted phenols selectively suppresses the decomposition reactions and permits the isomerization of the saturated hydrocarbons with a high degree of efficiency and low catalyst consumption. The exact mechanism by which these aromatic compounds suppress decomposition reactions is not thoroughly understood, but it will be evident from the experimental data hereinafter presented that greatly improved results are obtained when these compounds are present in the charging stock.

The phenols alone, including those containing one, two, or three hydroxy groups attached to the aromatic nucleus, are effective in suppressing decomposition reactions during the isomerization of saturated hydrocarbons but the aryl, alkyl, and cycloalkyl phenols are even more effective under most conditions of operation. The most common aryl phenols which may be used are the phenyl phenols. Examples of alkyl phenols which may be utilized in the process of our invention are cresol or methyl phenol, ethyl phenol, isopropyl phenol, butyl phenol, etc. In the class of cycloalkyl phenols, cyclopentyl phenol and cyclohexyl phenol are typical.

These various phenols are not necessarily equivalent in their effectiveness since obviously different amounts of phenol may be required dependent upon the nature of the catalyst and charging stock and also upon the operating conditions employed. The concentration of the phenol or substituted phenol in the isomerization charging stock is generally from about 0.1% to about 5% by weight. The use of the above mentioned compounds to suppress decomposition reactions is particularly applicable to the isomerization of normal pentane since normal pentane exhibits an unusual tendency to undergo decomposition when subjected to isomerizing conditions. The various phenols are separated from the isomerization reaction products by fractionation or other suitable means and may be recycled to the isomerization step.

The operating conditions of the isomerization process such as temperature and pressure will vary somewhat depending upon the phenol and catalyst employed. Ordinarily, temperatures within the range of about 50° F. to about 350° F. and more preferably within the range of from about 120° F. to about 250° F. and pressures varying from substantially atmospheric to about 500 pounds per square inch or more are desirable.

Any of the well-known Friedel-Crafts type isomerization catalysts may be employed. It is desirable that a hydrogen halide such as hydrogen chloride and hydrogen bromide be used in conjunction with these catalytic materials. The ordinary concentration of the hydrogen halide is within the range of about 1 to about 40 mol per cent of the charge and preferably from about 5 to about 20 mol per cent. The preferred catalysts comprise the chlorides and bromides of aluminum, zinc, zirconium, and iron, either alone or in admixture with one another. These catalysts may be employed in the solid granular state or upon inert supporting materials such as alumina, silica, thoria, crushed firebrick, quartz, activated clays, and activated chars.

It is also within the scope of this invention to employ mixtures of these compounds and in particular the aluminum halides with the halides of antimony, bismuth, and arsenic, to form catalyst composites which are molten under the conditions of operation.

The isomerization operation may be conducted in various ways. For example, the heated hydrocarbon charge containing the added phenol may be passed either in the liquid, vapor, or mixed phase through a reaction zone containing a bed of solid granular catalyst either supported or unsupported, and the reaction product may be separated into the desired isomers and unconverted material the latter being recycled to the reaction zone.

Another method of operation consists of employing a catalyst supply chamber containing a bed of granular catalyst through which a stream of the charge is passed in liquid phase to dissolve the required amount of catalyst. This catalyst-containing stream is introduced into a reaction zone along with a regulated amount of the hydrogen halide, and a substantial portion of the hydrocarbon is isomerized therein. This reaction zone may comprise a large vessel which will provide sufficient time for the reaction to occur or may be filled with a retaining material such as molten salts, hydrocarbon-metal halide complexes, or solid packing materials such as bauxite, Raschig rings, berl saddles, granular quartz and other materials well known to those skilled in the art.

The following examples illustrate in a general way the effectiveness of the compounds disclosed herein in suppressing decomposition reactions during the isomerization operation. It is not intended that these examples unduly limit the generally broad scope of this invention.

A series of experiments was conducted to investigate the effect of phenol, para tertiarybutyl phenol, and para cyclohexyl phenol in the normal pentane isomerization reaction. An electrically heated autoclave equipped with a mechanical stirrer was charged with 85 grams of normal pentane and the designated amount of aromatic compound, and anhydrous aluminum chloride and hydrogen chloride were added. The autoclave was sealed and the reaction was carried out for a period of six hours. A blank run was also made without the addition of a phenol to suppress decomposition reactions. The pertinent data from these tests are tabulated as follows:

| Run No. | 1 | 2 | 3 | 4 |
|---|---|---|---|---|
| Charge, grams: | | | | |
| Aluminum chloride | | 15 | | |
| Hydrogen chloride | 2.8 | 2.5 | 2.8 | 2.8 |
| n-Pentane | | 85 | | |
| Phenol | 0 | 1.5 | 0 | 0 |
| p-Tertiarybutyl phenol | 0 | 0 | 2.2 | 0 |
| p-Cyclohexyl phenol | 0 | 0 | 0 | 2.0 |
| Temperature, °C | | 75 | | |
| Maximum pressure, p. s. i. gage | 110 | 112 | 50 | 65 |
| Time, Hours | | 6 | | |
| Analysis of product, mol percent: | | | | |
| i-Butane | 54.1 | 40.6 | 5.3 | 7.1 |
| n-Butane | 8.1 | 11.6 | 0.5 | |
| i-Pentane | 19.2 | 25.6 | 29.4 | 43.9 |
| n-Pentane | 11.8 | 16.8 | 60.5 | 45.0 |
| Hexane and higher | 6.8 | 5.4 | 4.3 | 4.0 |

In run 1, which was the blank run, it will be noted that although 19.2% isopentane was obtained there was also a total butane production of 62.2% which represents a relatively low efficiency of conversion to isopentane. In run 2 employing phenol, 25.6% isopentane was obtained with 52.2% of butane thus indicating a distinct although relatively small effect of phenol in suppressing decomposition reactions. At somewhat different operating conditions higher conversions to isopentane would probably be obtained without extensive decompositions.

In runs 3 and 4, tertiarybutyl and cyclohexyl phenols were employed, respectively. Comparing the results of these tests with the results obtained in run 1 it will be noted that the presence of the substituted phenols suppressed the butane production to a marked extent and resulted in high yields of isopentane.

In another experiment on a smaller scale employing relatively pure aluminum chloride better results were obtained using phenol to suppress decomposition than are shown in run 2. In this experiment 8.56 grams of normal pentane and 0.187 grams of phenol were contacted with 1.51 grams of aluminum chloride and 30.3 cc. of hydrogen chloride (as measured at normal temperature and pressure conditions) was introduced into the reaction zone. The reaction was carried out for six hours at 75° C. The analysis of the product showed the following mol per cent composition: 0.8% butanes, 16.7% isopentane, 81.7% normal pentane, and 0.8% hexane and higher. Although the yield of isopentane was low it will be noted that the efficiency was very high since only 0.8 mol per cent of butanes was produced by decomposition reactions.

We claim as our invention:

1. An isomerization process which comprises contacting a normally liquid paraffin hydrocarbon and a phenolic compound containing a hydrocarbon substituent with a Friedel-Crafts type isomerizing catalyst under isomerizing conditions.

2. The process of claim 1 wherein said compound comprises tertiary butyl phenol.

3. The process of claim 1 wherein said compound comprises cyclohexyl phenol.

4. An isomerization process which comprises contacting a normally liquid paraffin hydrocarbon and a phenolic compound containing a hydrocarbon substituent with a metal halide of the Friedel-Crafts type and a hydrogen halide under isomerizing conditions.

5. An isomerization process which comprises contacting a normally liquid paraffin and a phenolic compound containing a hydrocarbon substituent with an aluminum chloride catalyst and hydrogen chloride under isomerizing conditions.

6. An isomerization process which comprises contacting normal pentane and a phenolic compound containing a hydrocarbon substituent with a Friedel-Crafts type isomerizing catalyst under isomerizing conditions.

7. An isomerization process which comprises contacting normal pentane and a phenolic compound containing a hydrocarbon substituent with an aluminum chloride catalyst and hydrogen chloride under isomerizing conditions.

8. The process of claim 7 wherein said compound comprises tertiarybutyl phenol.

9. The process of claim 7 wherein said compound comprises cyclohexyl phenol.

10. An isomerization process which comprises contacting a normally liquid paraffinic material containing a relatively small amount of an aryl phenol with an aluminum halide catalyst under isomerizing conditions.

11. An isomerization process which comprises contacting a normally liquid paraffinic material containing a relatively small amount of an alkyl phenol with an aluminum halide catalyst under isomerizing conditions.

12. An isomerization process which comprises contacting a normally liquid paraffinic material containing a relatively small amount of a cycloalkyl phenol with an aluminum halide catalyst under isomerizing conditions.

HERMAN PINES.
RICHARD C. WACKHER.

REFERENCES CITED

The following references are of record in the file of this patent:

UNITED STATES PATENTS

| Number | Name | Date |
| --- | --- | --- |
| 2,317,241 | Ackerman et al. | Apr. 20, 1943 |
| 2,265,548 | Schult | Dec. 9, 1941 |
| 2,382,815 | Sutton et al. | Aug. 14, 1945 |